No. 828,699. PATENTED AUG. 14, 1906.
L. ZAMBONI & R. H. BOWEN.
PULLEY FRAME.
APPLICATION FILED OCT. 12, 1904.
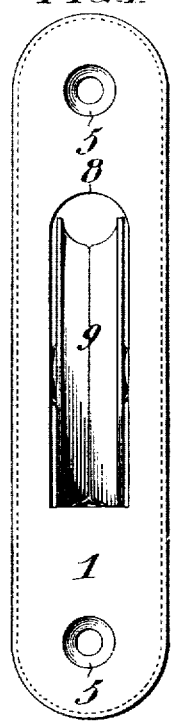
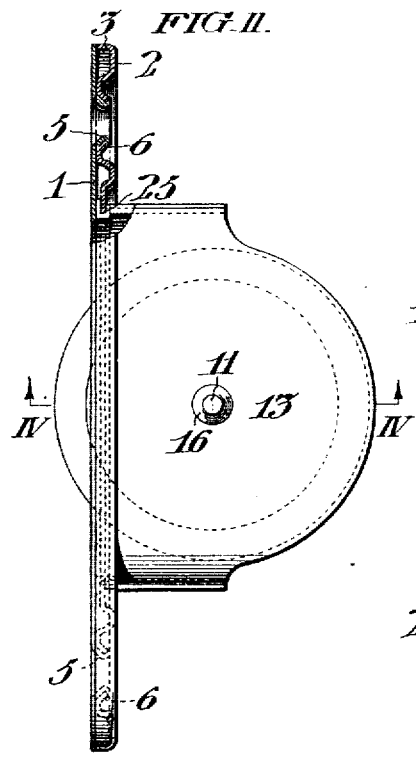
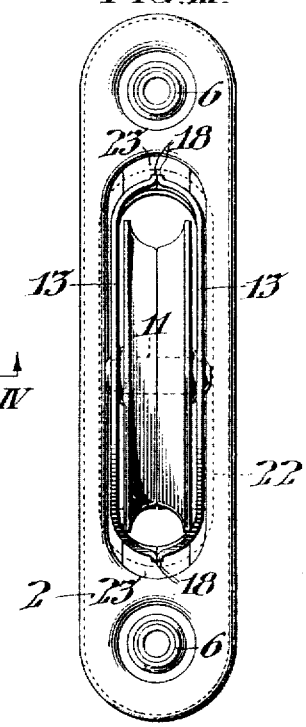
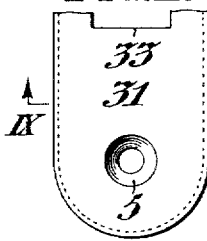
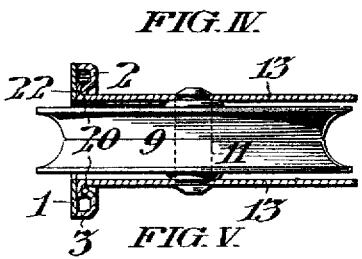
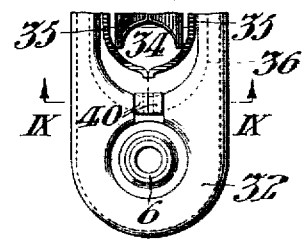
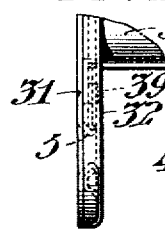
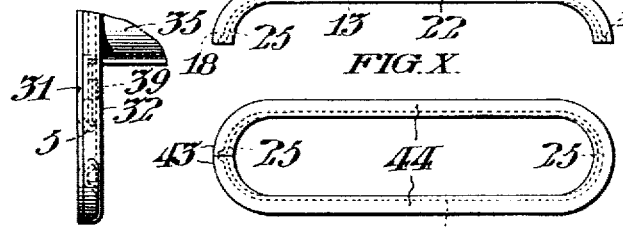
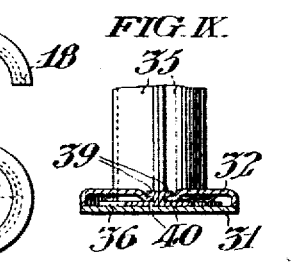
WITNESSES:
Clifton C. Hallowell
John C. Bergner
INVENTORS:
LAWRENCE ZAMBONI
AND
RUSSELL H. BOWEN,
By Paige, Paul & Bailey,
Attys.

UNITED STATES PATENT OFFICE.

LAWRENCE ZAMBONI, OF PHILADELPHIA, PENNSYLVANIA, AND RUSSELL H. BOWEN, OF PALMYRA, NEW JERSEY, ASSIGNORS TO THE AMERICAN PULLEY COMPANY, OF PHILADELPHIA, PENNSYLVANIA, A CORPORATION OF PENNSYLVANIA.

PULLEY-FRAME.

No. 828,699.     Specification of Letters Patent.     Patented Aug. 14, 1906.

Application filed October 12, 1904. Serial No. 228,165.

*To all whom it may concern:*

Be it known that we, LAWRENCE ZAMBONI, residing at Philadelphia, in the county of Philadelphia and State of Pennsylvania, and RUSSELL H. BOWEN, residing at Palmyra, in the county of Burlington and State of New Jersey, have invented certain new and useful Improvements in Pulley-Frames, whereof the following is a specification, reference being had to the accompanying drawings.

Our invention relates particularly to frames for window-sash pulleys; and it is an object of our invention to provide a frame of pressed sheet metal which can be manufactured at less cost than the cast-metal frames heretofore employed.

Our invention includes a frame comprising a face-plate which is adapted to be set in the window-jamb and to which is rigidly secured a pressed sheet-metal casing inclosing a pulley and supporting a shaft upon which the pulley rotates. As hereinafter described, said face-plate may be hollow and comprise front and back members which are oppositely-pressed pieces of sheet metal having registered screw-sockets, the margins of which are pressed or riveted to permanently connect said two members, and said casing may be conveniently formed of two oppositely-pressed pieces of sheet metal provided with flanges which are engaged between the front and back members of said face-plate, said back member of the face-plate and the casing members being provided with interengaging means to maintain them in rigid relation.

Our invention comprises the various novel features of construction and arrangement hereinafter more definitely specified.

In the drawings, Figure I is a front view of a frame conveniently embodying our invention. Fig. II is a side view of the frame, shown in Fig. I partly broken away. Fig. III is a rear view of said frame. Fig. IV is a transverse sectional view taken on the line IV IV in Fig. II. Fig. V is an elevation of the flanged edge of the casing member shown in Fig. II and at the left-hand side of Fig. III. Fig. VI is a fragmentary front view of a modified form of our invention. Fig. VII is a side view of the device shown in Fig. VI. Fig. VIII is a rear view of the device shown in Figs. VI and VII. Fig. IX is a transverse sectional view taken on the line IX IX in Fig. VIII. Fig. X is a view similar to Fig. V, but showing a unitary form of pulley-casing.

In said figures the hollow face-plate comprises the front member 1 and the back member 2, which are both formed of pressed sheet metal, the member 2 being recessed and provided with the peripheral spacing-flange 3, arranged to contact with the plane member 1, as shown in Figs. II and IV. Said front member 1 is provided with countersunk pressed sockets 5, which register with corresponding sockets 6 in the back member 2 of the face-plate to receive the heads of screws to conveniently secure the face-plate in the window-jamb, and said members 1 and 2 are secured in rigid relation by the edges of the sockets 5, which are pressed or riveted over the edges of the sockets 6, as best shown at the upper end of Fig. II. It may be noted that the hollow construction above described is much more rigid than if the front and back members of the face-plate were in contact with each other without the interposition of the spacing-flange 3.

The face-plate 1 contains the opening 8, through which the pulley 9 projects, adjoining the sash whose cord is to extend over said pulley, and the latter is mounted to rotate on the shouldered shaft 11, which extends through the oppositely-pressed sheet-metal members 13, which form a casing inclosing said pulley. Said shouldered shaft 11 being provided with rivet-heads 16 on the outside of said casing members 13 secures them in rigid relation, with their opposite end flanges 18 in contact. Said casing members 13 extend rearwardly through the opening 20 in the back face-plate 2, which opening is somewhat larger than the opening 8 in the face-plate 1 with which it registers, and said casing members are provided with the outwardly-turned retaining-flanges 22, which are held between the front and back face-plates 1 and 2, as shown in Figs. II and IV. Said front and back members 1 and 2 may be made of the same or different metals—for instance, the plate 1 may be brass and the remainder of the frame steel. In either event we find it desirable to provide means to secure the casing members 13 in rigid relation with said back member 2 independently of said front member 1, and in the form of our invention shown in Figs. I to V, inclusive, the rear face-plate 2 is provided with the flaps 23, which diverge from the plane of said member 2 when the casing members are being inserted through the opening 20, but which are subsequently pressed flat into engagement with the recesses 25 in the opposite ends of said casing members 13, as shown in Fig. II, to interengage said casing members 13 and plate 2.

Although we find it convenient to employ the interengaging flaps 23 and recesses 25, above described, it is to be understood that other means may be provided upon the casing members and face-plate to maintain them in rigid relation—for instance, in the form of our invention shown in Figs. VI to IX, inclusive. The front and rear face-plates 31 and 32 are provided with registered openings 33 and 34, similar to the openings 8 and 20 in the face-plate above described, and the opposed casing members 35 are provided with peripheral flanges 36, having lugs 39 extending through the opening 40 in the rear face-plate 32 and pressed to engage the latter, as shown in Figs. VIII and IX.

Although we find it convenient to form the casing of oppositely-pressed primarily-separate members 13, which are maintained in contact on the center line of the pulley 9, as described, the casing may be formed, as indicated in Fig. X, of a single piece of sheet metal 42, having its ends 43 in contact and comprising the flange 44, which latter, like the flanges 22, above described, is held between the front and back members of the face-plate.

We do not desire to limit ourselves to the precise details of construction and arrangement herein set forth, as it is obvious that various modifications may be made therein without departing from the essential features of our invention.

We claim—

1. In a pulley-frame, the combination with a hollow face-plate, comprising primarily separate front and back members of pressed sheet metal, having a spacing-flange between them and having registered openings for a pulley and having means connecting said face-plate members in rigid relation; a pressed sheet-metal casing having flanges on its opposite edges extending between said face-plates members; a shaft in said casing; and, a pulley mounted to rotate in said casing on said shaft, substantially as set forth.

2. In a pulley-frame, the combination with a hollow face-plate, comprising primarily separate front and back members of pressed sheet metal, having a spacing-flange between them and having registered openings for a pulley and having means connecting said face-plate members in rigid relation, comprising interengaged screw-socket flanges; a pressed sheet-metal casing having a recess and flanges on its opposite edges extending between said face-plate members; a flap on one of said face-plate members engaging said casing-recess; a shaft in said casing; and, a pulley mounted to rotate in said casing on said shaft, substantially as set forth.

3. In a pulley-frame, the combination with a hollow face-plate comprising a plane front member and a recessed back member formed of pressed sheet metal, having a spacing-flange between them and having registered openings for a pulley and having means connecting said face-plate members in rigid relation; oppositely-pressed sheet-metal members forming a casing having flanges on its opposite edges extending between said face-plate members; means respectively integral with said casing members and said face-plate, interengaging them in rigid relation; a shaft in said casing connecting its opposite members in rigid relation; and, a pulley mounted to rotate in said casing on said shaft, substantially as set forth.

4. In a pulley-frame, the combination with a hollow face-plate comprising a plane front member and a recessed back member formed of pressed sheet metal, having a spacing-flange between them and having registered openings for a pulley and having means connecting said face-plate members in rigid relation, comprising interengaged screw-socket flanges; oppositely-pressed sheet-metal members forming a casing having retaining-recesses at its opposite ends, and outwardly-turned flanges extending between said face-plate members; flaps at the opposite ends of said back plate member engaging said casing-recesses; a shaft in said casing; connecting its opposite members in rigid relation; and, a pulley mounted to rotate in said casing on said shaft, substantially as set forth.

5. In a pulley-frame, a hollow face-plate comprising primarily separate front and back members of pressed sheet metal, having a spacing-flange between them and having registered openings for a pulley, substantially as set forth.

6. In a pulley-frame, the combination with a hollow face-plate comprising primarily separate front and back members of pressed sheet metal, having a spacing-flange between them having registered openings for a pulley and means connecting said face-plate members in rigid relation, comprising interengaged screw-socket flanges respectively in integral relation with said members, one of which is riveted over the edge of the other, substantially as set forth.

7. In a pulley-frame, the combination with a face-plate having a flap 23, extending parallel with the plane of the face-plate; of a casing having a recess 25, extending parallel with said face-plate; said flap being composed of material that is capable of being bent with respect to said face-plate to engage said recess, substantially as set forth.

8. In a pulley-frame, the combination with a face-plate; of a casing comprising laterally-extending flanges 22, and recesses 25, at its opposite ends extending parallel with said face-plate; said face-plate having connected parts engaging said flanges and recesses, and securing said face-plate and casing in rigid relation, substantially as set forth.

9. In a pulley-frame, the combination with a face-plate; of a casing comprising laterally-extending flanges 22, and recesses 25, at its opposite ends extending parallel with said face-plate, and having means in integral relation therewith, engaging said flanges and recesses, and securing said face-plate and casing in rigid relation, substantially as set forth.

In testimony whereof we have hereunto signed our names, at Philadelphia, Pennsylvania, this 8th day of October, 1904.

LAWRENCE ZAMBONI.
RUSSELL H. BOWEN.

Witnesses:
JOHN E. ZIMMERMAN,
HARRY M. BARNHART.